(12) United States Patent
Dowty (10) Patent No.: US 8,015,946 B2
(45) Date of Patent: Sep. 13, 2011

(54) CAGE FREE NEST

(75) Inventor: Larry D. Dowty, Milford, IN (US)

(73) Assignee: CTB, Inc., Milford, IN (US)

( * ) Notice: Subject to any disclaimer, the term of this patent is extended or adjusted under 35 U.S.C. 154(b) by 758 days.

(21) Appl. No.: 11/970,206

(22) Filed: Jan. 7, 2008

(65) Prior Publication Data
US 2008/0173250 A1    Jul. 24, 2008

Related U.S. Application Data

(60) Provisional application No. 60/886,128, filed on Jan. 23, 2007.

(51) Int. Cl.
*A01K 31/16* (2006.01)
(52) U.S. Cl. ........................ 119/347; 119/335
(58) Field of Classification Search .................. 119/347, 119/335, 337, 338, 346, 334
See application file for complete search history.

(56) References Cited

U.S. PATENT DOCUMENTS

| | | | | |
|---|---|---|---|---|
| 2,764,128 A * | 9/1956 | Howley et al. | ................ | 119/337 |
| 3,046,940 A * | 7/1962 | Kurtz | ............................ | 119/335 |
| 3,139,065 A * | 6/1964 | Willauer, Jr. | .................. | 119/337 |
| 3,242,904 A * | 3/1966 | Rannou | .......................... | 119/337 |
| 3,429,298 A * | 2/1969 | Thomason | ..................... | 119/448 |
| 3,552,359 A * | 1/1971 | Graves et al. | ................. | 119/336 |
| 3,626,906 A * | 12/1971 | Voran et al. | ..................... | 119/452 |
| 3,650,246 A * | 3/1972 | Fowler et al. | ................ | 119/337 |
| 3,799,114 A * | 3/1974 | Kenjesky | ....................... | 119/452 |
| 4,112,872 A * | 9/1978 | Van Huis | ....................... | 119/455 |
| 4,364,332 A * | 12/1982 | Smith | ............................ | 119/337 |
| 4,425,873 A * | 1/1984 | Rinne, Jr. | ......................... | 119/53 |
| 4,516,532 A * | 5/1985 | Rafaeli | ............................ | 119/334 |
| 4,696,257 A * | 9/1987 | Neary et al. | .................. | 119/166 |
| 4,766,849 A * | 8/1988 | Kawabata et al. | ............ | 119/337 |
| 5,058,530 A * | 10/1991 | Van De Ven | .................. | 119/337 |
| 5,094,186 A * | 3/1992 | Andersen | ....................... | 119/337 |
| 5,551,371 A * | 9/1996 | Markey et al. | ................ | 119/499 |
| 6,095,087 A * | 8/2000 | Bloedorn | ..................... | 119/52.2 |

(Continued)

FOREIGN PATENT DOCUMENTS

EP          115918 A1 *  8/1984

OTHER PUBLICATIONS

Vencomatic, Bolegg Terrace System, Brochure, 1 page, Published in The Netherlands, 2004.

*Primary Examiner* — Yvonne R. Abbott
(74) *Attorney, Agent, or Firm* — Clark Hill PLC (57) ABSTRACT

A cage free nest has nest bottoms that have raised/rounded portions proximate to the entranceways into the cage free nest. A ramp extends from a surface to connect to the nest bottoms proximate to the entranceway. Both the nest bottoms and the ramp are formed of a non-slip, woven galvanized steel wire. The cage free nest also has upper and lower top panels that make up a roof assembly of the cage free nest. The lower top panels can be moved relative to the upper top panels to an opened/raised position by a cable assembly to allow for visual inspection into the cage free nest through the entranceways. The upper top panels can be moved relative to the lower top panels to an opened/raised position to allow for visual inspection into the cage free nest through the roof assembly.

14 Claims, 5 Drawing Sheets

U.S. PATENT DOCUMENTS

| | | | |
|---|---|---|---|
| 6,234,114 B1* | 5/2001 | Dyer | 119/334 |
| 6,394,031 B1* | 5/2002 | Moller | 119/337 |
| 6,408,796 B1* | 6/2002 | Hampel | 119/498 |
| 6,450,120 B1* | 9/2002 | Nylen | 119/52.2 |
| 6,470,827 B2* | 10/2002 | Nannemann | 119/439 |
| 7,047,904 B2* | 5/2006 | Smith | 119/337 |
| 2004/0020444 A1* | 2/2004 | Missry | 119/429 |
| 2004/0144326 A1* | 7/2004 | Smith | 119/337 |
| 2008/0022942 A1* | 1/2008 | Chu | 119/500 |
| 2008/0072833 A1* | 3/2008 | Meeks et al. | 119/166 |
| 2009/0114164 A1* | 5/2009 | Liu | 119/475 |
| 2009/0126646 A1* | 5/2009 | Johnston | 119/338 |
| 2010/0116218 A1* | 5/2010 | Pitkaranta | 119/449 |

* cited by examiner

CAGE FREE NEST

CROSS-REFERENCE AND INCORPORATION BY REFERENCE

This patent application claims the benefit of domestic priority of U.S. Provisional Application Ser. No. 60/886,128, filed Jan. 23, 2007, and entitled "Rear Egg Roll-Out Commercial Cage Free Nest". U.S. Provisional Application Ser. No. 60/886,128 is hereby incorporated by reference.

FIELD OF THE INVENTION

The present invention generally relates to cage free nests. More specifically, the present invention relates to rear egg roll-out commercial cage free nests.

BACKGROUND OF THE INVENTION

Rear egg roll-out commercial cage free nests are well-known in the art, but suffer from a number of disadvantages. For instance, these prior art cage free nests do not provide comfort features for birds when walking into the cage free nests as the entrance to the cage free nests can, for instance, have squared-off edges or become slippery in view of the materials used, for example wood. These prior art cage free nests also do not have tops which allow a house manager to inspect the nest without having to remove the tops or hold back the curtains. The house manager also cannot inspect the egg belt without having to holdup the nest top or remove it altogether. Further, the tops on prior art cage free nests are prone to falling into the nest, which can possibly cause harm to the birds therein, if the tops or other parts of the cage free nests are bumped or misaligned.

Thus, there is a need for a cage free nest which overcomes the disadvantages of prior art cage free nests. The present invention, provides a cage free nest which overcomes these disadvantages.

SUMMARY OF THE INVENTION

Briefly, and in accordance with the foregoing, the invention provides a novel cage free nest. The cage free nest has nest bottoms configured to have rounded/raised portions at the entranceways to the cage free nest such that a bird can step on the rounded/raised portions while entering and exiting the nesting area. The nest bottoms and the ramps leading to the entranceways from the surface below are formed of a non-slip, woven galvanized steel wire which allows for the birds to grip the nest bottoms and the ramps easily, even in the event that the nest bottoms and ramps have moisture or other materials built-up thereon. The build-up of moisture and other materials is also minimal because of the openings provided through the woven steel wire.

The cage free nest also has upper and lower top panels spanning the distance between adjacent sidewalls. The upper and lower top panels are hingedly connected to one another such that the upper top panels can be moved upwardly relative to the lower top panels and such that the lower top panels can be moved upwardly relative to the upper top panels. The lower top panels are connected to a cable assembly and have curtains hanging downwardly therefrom to block visibility into the nesting area of the cage free nest. The cable assembly can be manipulated either manually or remotely to lift up the lower top panels, and thus the curtains, to allow for visual inspection into the nesting area through the entranceways. The upper top panels can also be manually moved upwardly relative to the lower top panels in order to allow for visual inspection into the nesting area and to the egg tray through the roof assembly.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated and described herein.

An embodiment of a cage free nest 20 of the present invention is illustrated in FIGS. 1-8 and will be described with reference thereto. The cage free nest 20 is configured to be positioned side-by-side another like cage free nest 20 in order to form a cage free nest assembly (not shown). Such a cage free nest assembly may have a plurality of like cage free nests 20 positioned side-by-side within a poultry house (not shown). Each cage free nest 20 is formed of a pair of sidewalls 22 (only one of which is shown) which are separated from one another by a predetermined distance. Each sidewall 22 has two side surfaces where one of the side surfaces acts as an interior surface to one of the cage free nests 20 and where the other one of the side surfaces acts as an interior surface to an adjacent cage free nest 20 (except of course for the two cage free nests 20 provided on the ends of the assembly).

Figure 2:
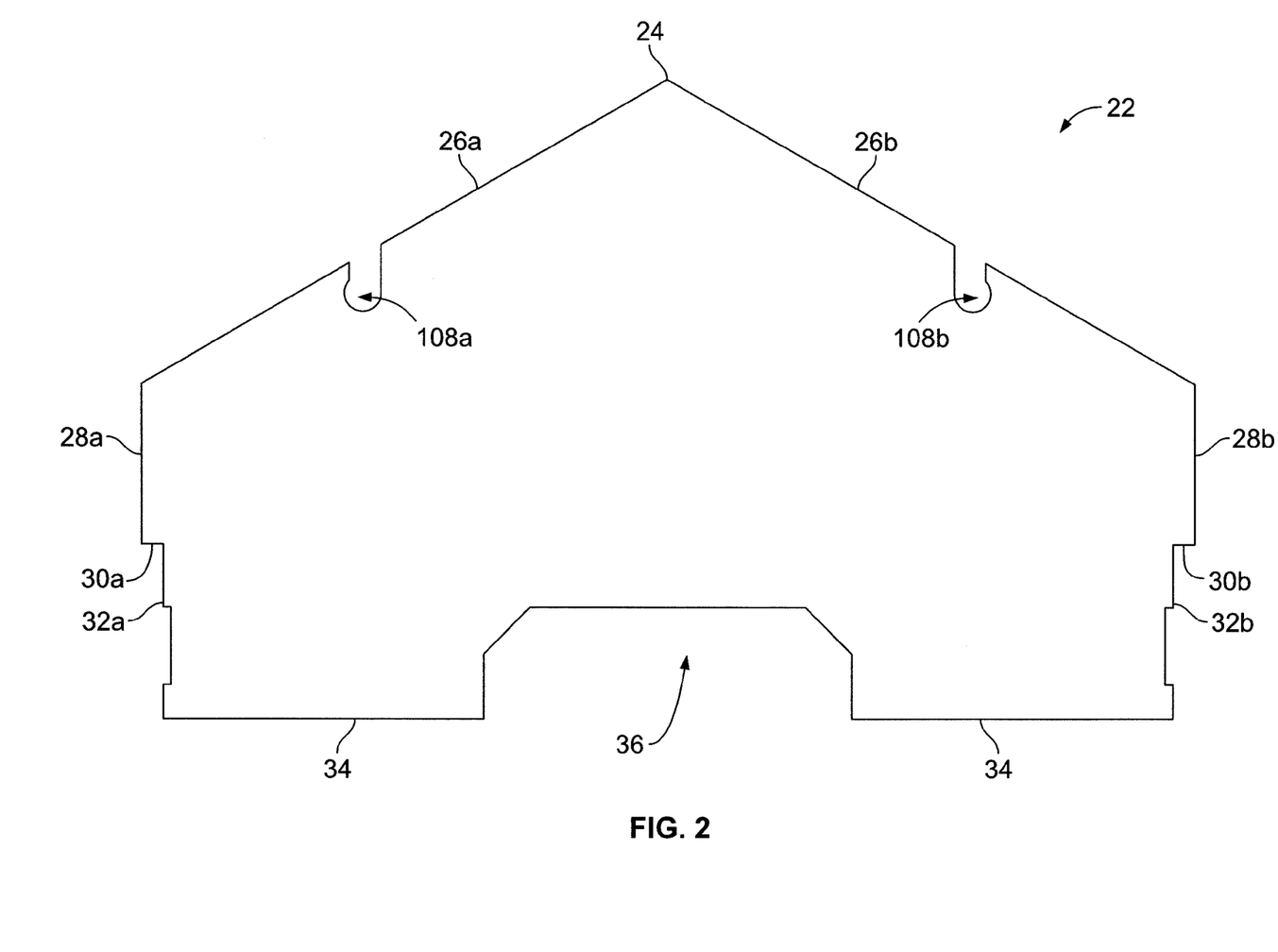
FIG. 2 is a side view of a sidewall used in forming the cage free nest of FIG. 1.

As best illustrated in FIG. 2, each sidewall 22 has a peak 24, first and second angled top edges 26a, 26b which extend downwardly from the peak 24 in opposite directions from one another, first and second upper side edges 28a, 28b which extend downwardly from said top edges 26a, 26b, first and second shoulder edges 30a, 30b which extend inwardly from said upper side edges 28a, 28b, and first and second lower side edges 32a, 32b which extend downwardly from said shoulder edges 30a, 30b. The upper side edges 28a, 28b are generally parallel with the lower side edges 32a, 32b. Each sidewall 22 also has a bottom edge 34 which has a notch 36 cut therein generally equidistantly between said lower side edges 32a, 32b.

An interior compartment 38 of the cage free nest 20 is thus defined between adjacent sidewalls 22. The cage free nest 20 further defines a pair of entranceways 40 into the interior compartment 38 on opposite side of the cage free nest 20 by the upper side edges 28a, 28b, the shoulder edges 30a, 30b, and the lower side edges 32a, 32b of the adjacent sidewalls 22.

Figure 1:
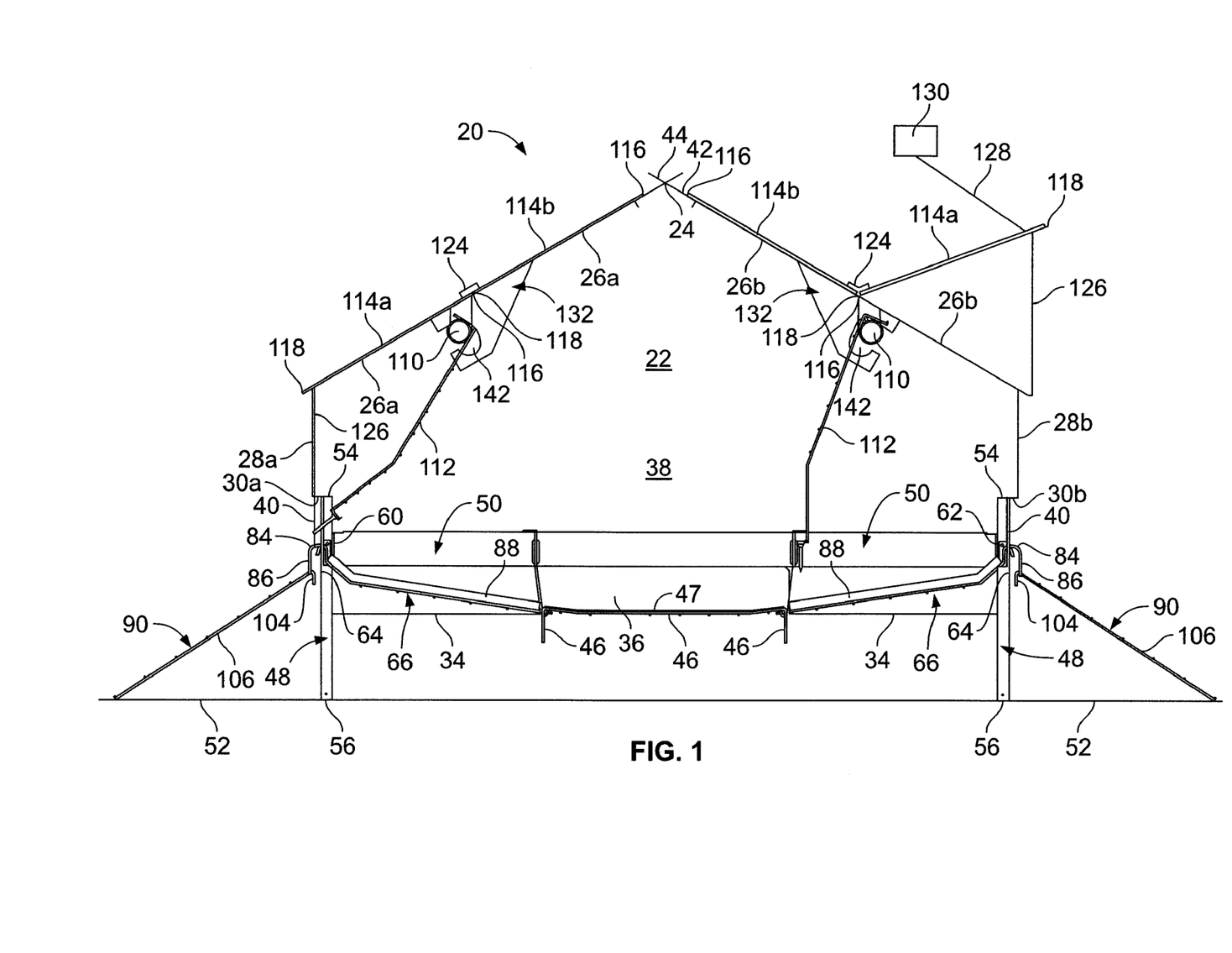
FIG. 1 is a cross-sectional side view of a cage free nest incorporating features of the invention, with a left side thereof illustrating a lower top panel in a closed/lowered position and a right side thereof illustrating the lower top panel in an open/raised position.

A top cap member 42 preferably extends over the top edges 26a, 26b and the peak 24. The top cap member 42 may extend across the entire cage free nest assembly or across one or more cage free nests 20 of the entire cage free nest assembly. An anti-roost wire assembly 44 preferably extends upwardly from the top cap member 42 in order to prevent the birds from roosting on the cage free nest 20. If desired, the anti-roost wire assembly 44 may also extend across the entire cage free nest assembly or across one or more cage free nests 20 of the entire cage free nest assembly.

An egg tray 46 of a type known in the art extends through the notches 36 of the sidewalls 22 in order to support one or more egg belt conveyors 47 which receive eggs laid by the birds and which transport the eggs through the cage free nest assembly to a collection area (not shown).

A pair of leg members 48 and a stabilizing cross-member 50 are preferably used to hold the cage free nest 20 in position and above a surface 52, such as the ground or a poultry house floor. Each leg member 48 has upper and lower ends 54, 56 and is generally U-shaped such that a gap (not shown) is defined by the leg members 48. The upper ends 54 of the leg members 48 are configured to abut against said shoulder edges 30a, 30b of the sidewalls 22 and the lower ends 56 of the leg members 48 are configured to abut against said surface 52. The gaps of the leg members 48 receive the lower side edges 32a, 32b of the sidewalls 22 therein in order to stabilize the sidewalls 22 within the leg members 48.

The cross-member 50 has first and second ends 60, 62 with the first end 60 being secured to one of the leg members 48 and the second end 62 being secured to the other one of the leg members 48. The cross-member 50 may also preferably be in facing and/or abutting relationship to the sidewall 22 as it spans the sidewall 22 generally from the first lower side edge 32a to the second lower side edge 32b. In spanning the sidewall 22, the cross-member 50 may cover a portion of the notch 36 cut into the sidewall 22.

The cage free nest 20 has a pair of extension support members 64. One of the extension support members 64 is preferably secured to adjacent leg members 48 that are provided proximate to the connection of the first ends 60 of the cross-members 50 to the leg members 48. Likewise, the other one of the extension support members 64 is preferably secured to adjacent leg members 48 that are provided proximate to the connection of the second ends 62 of the cross-members 50 to the leg members 48. If desired, the extension support members 64 may extend across the entire cage free nest assembly or across one or more cage free nests 20 of the entire cage free nest assembly. The extension support members 64 generally define lower boundaries of the entranceways 40 into the interior compartment 38 of the cage free nest 20.

Figure 3:
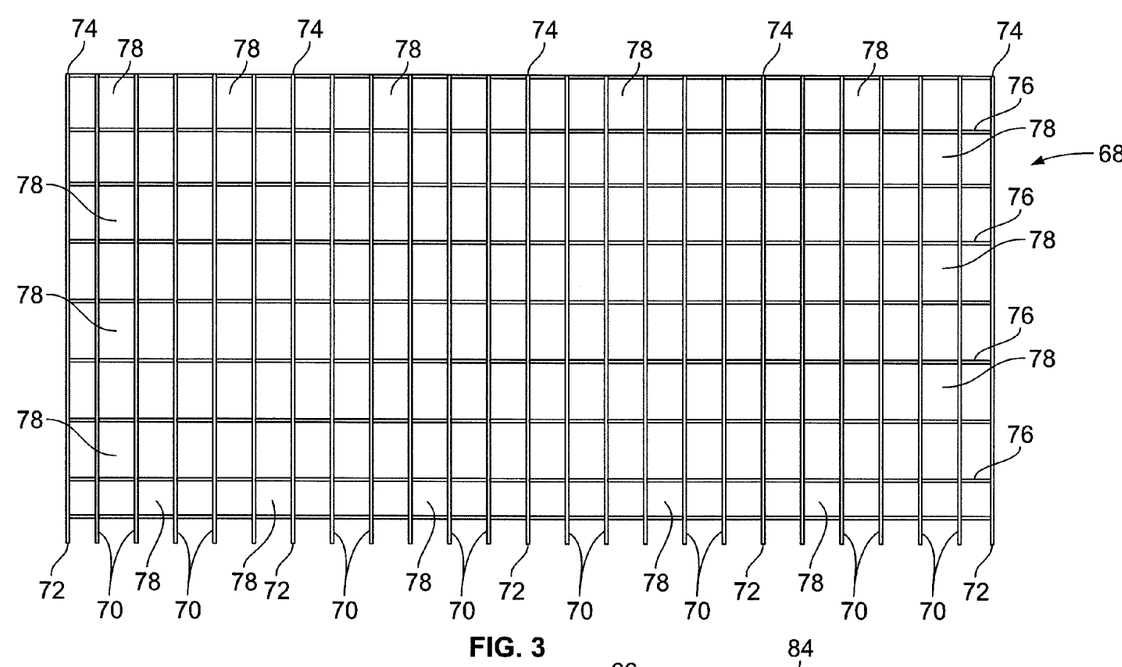
FIG. 3 is a top view of a blank used to form a nest bottom.
Figure 4:
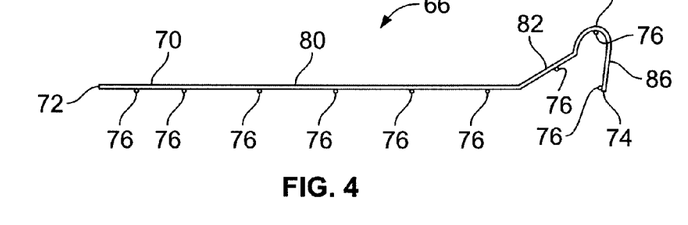
FIG. 4 is a side view of the nest bottom used in forming the cage free nest of FIG. 1.

A pair of nest bottoms 66 illustrated in FIGS. 1 and 4, are provided in the interior compartment 38 and extend outwardly from each side of the egg tray 46 between the sidewalls 22 generally to the entranceways 40. Each nest bottom 66 is preferably formed from a blank 68 of non-slip, woven galvanized steel wire, as illustrated in FIG. 3. As shown in FIG. 3, the blank 68 has a plurality of wires 70 extending from a first end 72 thereof to a second end 74 thereof with adjacent wires 70 being separated from one another by predetermined distance(s). The blank 68 also has a plurality of cross-wires 76 extending across and generally perpendicular to the plurality of wires 70. The adjacent cross-wires 76 are also separated from one another by predetermined distance(s) such that the wires 70 and the cross-wires 76 form a plurality of rectangular openings 78 therebetween. The rectangular openings 78 are preferably sized such that a bird's feet will not readily fall through the openings 78.

Each blank 68 is preferably formed into a nest bottom 66 having the following configuration. A first portion 80 of the nest bottom 66 which includes a first end portion of the nest bottom 66 extends outwardly from the first end 72 toward the second end 74. A second portion 82 of the nest bottom 66 extends angularly upwardly and outwardly from the first portion 80 toward the second end 74. The second portion 82 is preferably provided at an angle of one-hundred forty seven (147) degrees relative to the first portion 80. A third portion 84 of the nest bottom 66 is generally U-shaped and preferably rounded in a raised manner relative to the remainder of the nest bottom 66 such that it extends first upwardly and outwardly from the second portion 82 and then downwardly and outwardly toward the second end 74. A fourth portion 86 of the nest bottom 66 which includes or comprises a second end portion of the nest bottom 66 extends downwardly from the third portion 84 to the second end 74. The fourth portion 86 is preferably provided at an angle of fifty (50) degrees relative to the second portion 82.

The first end portions of each nest bottom 66 are preferably configured to be operatively associated with the egg tray 46, or to any other appropriate structure provided in generally close proximity to the egg tray 46, such that the first end portions of the nest bottoms 66 are supported. The extension support members 64 are preferably positioned to support the third U-shaped portions 84 of the nest bottoms 66 as best illustrated in FIG. 1. With the nest bottoms 66 being supported by the extension support members 64 and the egg tray 46, the fourth portions 86 of the nest bottoms 66 are generally parallel to the upper side edges 28a, 28b and the lower side edges 32a, 32b of the sidewalls 22, and the first and second portions 80, 82 of the nest bottoms 66 are generally sloped downwardly from the entranceways to the egg tray 46.

A pair of nest pads 88 are provided in the cage free nest 20 and rest on the first and second portions 80, 82 of the nest bottoms 66 between the third raised portions 84 of the nest bottoms 66 and the egg tray 46. The nest pads 88 rounded are formed of a softer material than the nest bottoms 66 in order to provide comfort to the birds as they nest and lay eggs.

Figure 5:
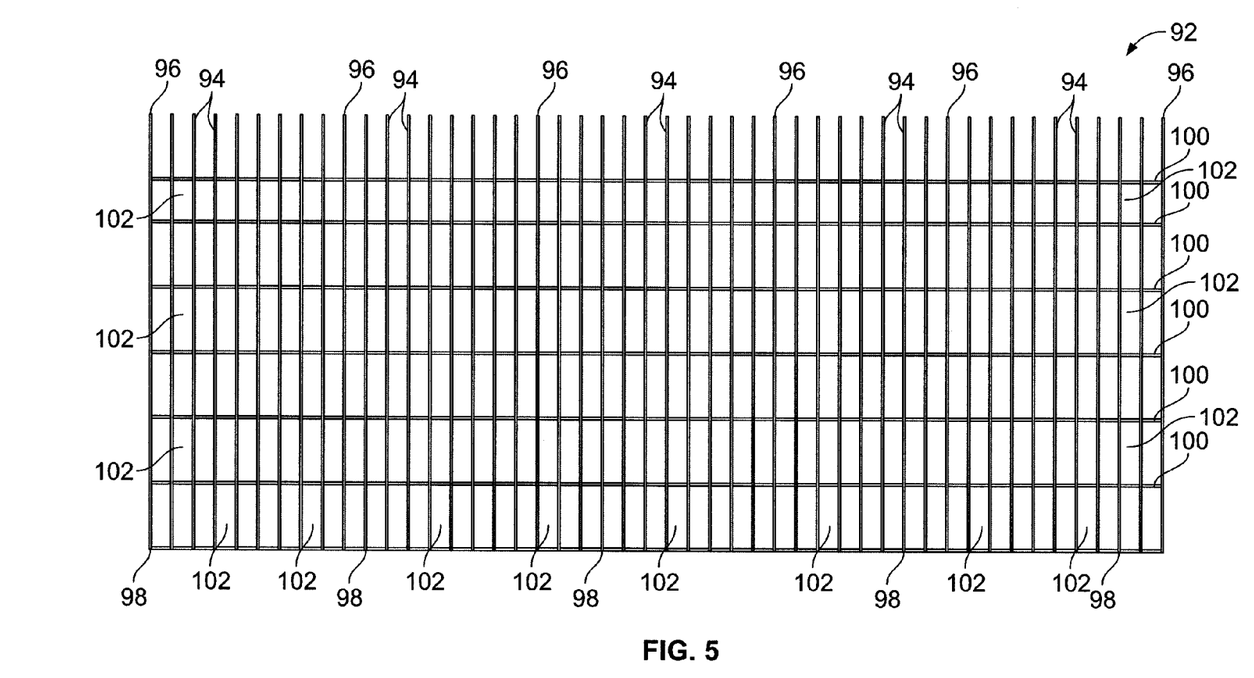
FIG. 5 is a top view of a blank used to form a ramp.
Figure 6:
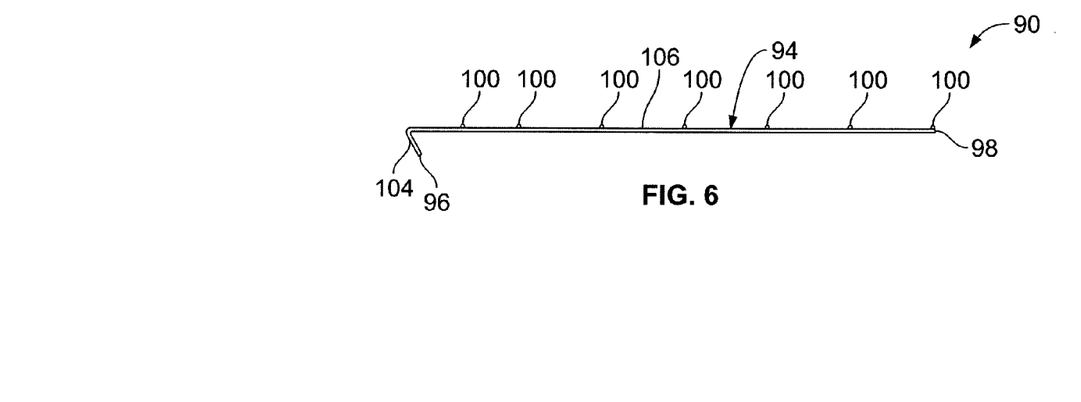
FIG. 6 is a side view of the ramp used in forming the cage free nest of FIG. 1.

A pair of ramp members 90 illustrated in FIGS. 1 and 6, are provided outside of the interior compartment 38 of the cage free nest 20 and extend generally downwardly and outwardly from the entranceways 40 to the surface 52 in order to allow the birds on the surface 52 to access the interior compartment 38 of the cage free nests 20 such that the birds can lay their eggs therein. Each ramp member 90 is preferably formed from a blank 92 of non-slip, woven galvanized steel wire, as illustrated in FIG. 5. As shown in FIG. 5, the blank 92 has a plurality of wires 94 extending from a first end 96 thereof to a second end 98 thereof with adjacent wires 94 being separated from one another by predetermined distance(s). The blank 92 also has a plurality of cross-wires 100 extending across and generally perpendicular to the plurality of wires 94. The adjacent cross-wires 100 are also separated from one another by predetermined distance(s) such that the wires 94 and the cross-wires 100 form a plurality of rectangular openings 102 therebetween. The rectangular openings 102 are preferably sized such that a bird's feet will not readily fall through the openings 102.

Each blank 92 is preferably formed into a ramp member 90 having the following configuration. A first portion 104 of the ramp member 90 which includes a first end portion of the ramp member 90 extends outwardly from the first end 96 toward the second end 98. A second portion 106 of the ramp member 90 which includes a second end portion of the ramp member 90 extends from the first portion 104 at an angle relative to the second end 98. The second portion 106 is preferably provided at an angle of sixty (60) degrees relative to the first portion 104. The first portion 104 is preferably much smaller than the second portion 106 in length and, therefore, acts as an angled flange protruding from the second portion 106 of the ramp member 90.

The ramp members 90 are secured to the second end portions of the nest bottoms 66 by inserting the angled flanges 104 of the ramp members 90 into the openings 78 in the second end portions of the nest bottoms 66 such that the connection between the angled flanges 104 and the second portion 106 of the ramp member 90 are supported by the cross-wires 76 provided in the second end portion of the nest bottoms 66. The second end portions and, thus, the second end 98 of the ramp members 90 are configured to be positioned on or proximate to the surface 52.

As such, when the cage free nest 20 is in use, birds on the surface 52 will walk up the second portions 106 of the ramp members 90 and into the interior compartment 38 of the cage free nest 20 by walking through the entranceways 40. Upon reaching the entranceways 40 the birds will have to walk onto the raised/rounded U-shaped third portions 84 of the nest bottoms 66 and then down onto the nest pads 88 in order to nest thereon and lay eggs. Upon laying their eggs while on the nest pads 88, because of the downward sloping of the nest bottoms 66 toward the egg tray 46, the laid eggs will gravitate downwardly toward and onto the conveyor supported by the egg tray 46, such that the conveyor can move the eggs to the collection area.

The nest bottoms 66 and ramp members 90 utilized in the cage free nest 20 of the present invention constitute a great improvement compared to nest bottoms and ramp members utilized in prior art cage free nests. The nest bottoms 66 and ramp members 90 of the present invention are formed on non-slip materials having the openings 78, 102 provided therein by the wires 70, 94 and cross-wires 76, 100 and, therefore, the birds can easily grip the nest bottoms 66 and ramp members 90 on their way in and out of the cage free nests 20, thus providing the birds with comfort and stability when heading to and from laying eggs. For instance, many prior art nest bottoms and ramp members are formed of wood which will begin to rot over time and which will become slippery upon a build-up of moisture and/or material thereon. In this respect, the openings 78, 102 provided through the nest bottoms 66 and the ramp members 90 also assist in preventing moisture/material build-up thereon as the moisture/material will fall through the openings 78, 102 to the surface 52 below, rather than being allowed to accumulate on the nest bottoms 66 and ramp members 90. Compared with prior art cage free nests, the raised/rounded shape of the third portions 84 of the nest bottoms 66 at the entranceways 40 also assist in providing birds with comfort as they are entering/leaving the cage free nest 20. In prior art cage free nests, the ends of the nest bottoms are generally just squared off and, thus, typically have sharp edges which may deter the birds from entering/leaving the cage free nests, or which may even harm the birds as they enter/leave the cage free nests. As it is highly desirable to have the birds enter the cage free nests 20 to lay their eggs as often as possible, i.e., larger egg production, it is desirable to have a cage free nest 20 that is configured to eliminate any reasons that a bird may desire to not enter the cage free nests 20 to lay their eggs. The comfort factors described herein with regard to the nest bottoms 66 and the ramp members 90 assist in this manner.

The first and second angled top edges 26a, 26b of the sidewalls 22 each have a notch 108a, 108b formed therein into which a pair of expeller tubes 110 rest. The expeller tubes 110 extend between the notches 108a, 108b and preferably extend between the notches 108a, 108b in adjacent sidewalls 22 of the entire cage free nest assembly.

A nest expeller 112 is configured to be secured to each of the expeller tubes 110 in a manner known in the art, such that the nest expellers 112 may be rotated in a manner known in the art in order to cause the ends of the nest expellers 112 to move from proximate to the egg tray 46 (as illustrated on the right hand side of FIG. 1) to proximate to the raised/rounded U-shaped third portions 84 of the nest bottoms 66 (as illustrated on the left hand side of FIG. 1). Such movement of the nest expellers 112 causes any birds on the nest pads 88 in the cage free nest 20 to be forced out of the cage free nest 20 through the entranceways 40. The next expellers 112, however, are configured to keep any eggs left in the cage free nest 20 to remain in the cage free nest 20 and, upon movement back toward the egg tray 46, to force the eggs left in the cage free nest 20 back toward the egg tray 46. The nest expellers 112 may be moved either manually or automatically as desired.

Each cage free nest 20 has a pair of lower top panel members 114a and a pair of upper top panel members 114b. All of the top panels 114a, 114b are generally rectangular in configuration and are preferably identical to one another such that each top panel 114a, 114b has an upper edge 116, a lower edge 118, and first and second side edges (not shown).

The top panel members 114a, 114b generally extend over the first and second angled top edges 26a, 26b from one sidewall 22 of the cage free nest 20 to the other sidewall 22 of the cage free nest 20 such that the first side edges are generally positioned on or over the first and second angled top edges 26a, 26b of one sidewall 22 of the cage free nest 20 and such that the second side edges are generally positioned on or over the first and second angled top edges 26a, 26b of the other sidewall 22 of the cage free nest 20. The top panel members 114a, 114b may be supported wholly by the angled top edges 26a, 26b of the sidewalls 22, or may be further supported by bracket members (not shown) secured to the sidewalls 22 proximate to the angled top edges 26a, 26b.

The upper top panel members 114b are also positioned such that the upper edges 116 thereof generally face and/or abut against the respective ends of the top cap member 42. The upper top panel members 114b also generally extend downwardly therefrom such that the lower edges 118 thereof generally face and/or abut against the upper edges 116 of the lower top panel members 114a. The lower top panel members 114a generally extend downwardly from the upper top panel members 114b such that the lower edges 118 thereof generally are positioned either at (not shown) or slightly beyond the first and second upper side edges 28a, 28b of the sidewalls 22, such that the lower top panel members 114a generally overhang the entranceways 40.

In prior art cage free nests, such a roof assembly of the cage free nests, where the top panel members are rectangular in configuration, were prone to falling into the nesting area and possibly harming the birds nesting therein whenever the sidewalls were bumped or otherwise moved out of proper position, such that the sidewalls would become misaligned. In the cage free nest 20 of the present invention, use of rectangular top panel members 114a, 114b is not disadvantageous because the sidewalls 22 are not prone to becoming misaligned because of the securement of the sidewalls 22, the leg members 48, the cross-member 50 and the extension support members 64 to one or more of each other, thus stabilizing the sidewalls 22 in their desired position to support the top panel members 114a, 114b. If the bracket members are secured to the sidewalls 22, the likelihood that the top panel members 114a, 114b would fall into the cage free nests 20 is further dramatically reduced.

Each lower top panel member 114a proximate to its upper edge 116 is connected to an upper top panel member 114b proximate to its lower edge 118 by one or more hinges 124 such that the lower top panel members 114a may be rotated upwardly relative to the upper top panel members 114b or such that the upper top panel members 114b may be rotated upwardly relative to the lower top panel members 114a.

Each lower top panel member 114a also has one or more, preferably two, curtains 126 hanging downwardly therefrom proximate to the lower edges 118 thereof which at least partially close off the entranceways 40 to the cage free nest 20 when the lower top panel members 114a are in their lowered/closed positions resting on the top edges 26a, 26b of the sidewalls 22. The curtains 126 preferably provide an accessway (not shown—but defined as a portion of the entranceways 40) therebetween into the cage free nest 20 for the birds.

The lower top panel members 114a are configured to be opened and closed remotely in order to allow for visual inspection into the interior compartments 38 of the cage free nests 20 through the entranceways 40. The lower top panel members 114a are preferably connected to cables 128 proximate to their lower edges 118. The cables 128 extend to one or more linear actuators 130 which are provided at a predetermined position in the facility where the cage free nest 20 and/or cage free nest assembly is provided.

When the linear actuator 130 is not actuated, the cables 128 allow the lower top panel members 114a to remain in their lowered/closed positions, in order to close off the top of the cage free nests 20, as illustrated on the left-hand side of FIG. 1, and to at least partially close off the entranceways 40 of the cage free nests 20. When the linear actuator 130, however, is actuated, the cables 128 pull the lower top panel members 114a upwardly such that the lower top panel members 114a rotate upwardly relative to the upper top panel members 114b about the hinges 124 to a raised/opened position, thus allowing for visual inspection into the top of the cage free nest 20 and through the entranceways 40 of the cage free nests 20, as illustrated on the right-hand side of FIG. 1. With the lower top panel members 114a being configured to be opened and closed remotely, a house manager can visually inspect the nest area in the interior compartment 38 of the cage free nest 20 without having to physically remove the top panels 114a, 114b of the cage free nests 20 or physically holding back the curtains 126. Of course, if desired by the house manager, the lower top panel members 114a could also be rotated upwardly about the hinges 124 manually.

Figure 8:
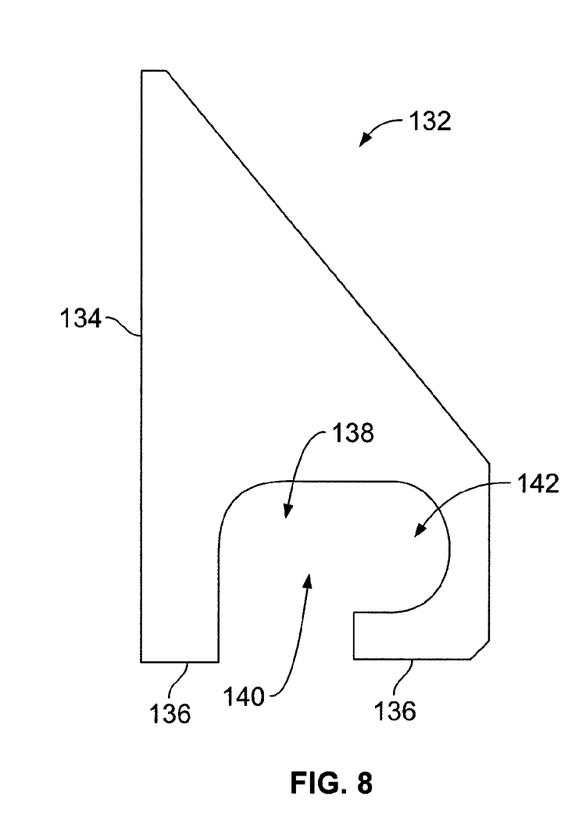
FIG. 8 is a side view of a pivot cover used in forming the cage free nest of FIG. 1.

The upper top panel members 114b are each connected to at least one pivot cover 132. As best illustrated in FIG. 8, each pivot cover 132 has an elongated edge 134 which is configured to be positioned against, or to face, the undersides of both of the lower top panel members 114a and the upper top panel members 114b. The pivot covers 132 are connected to the upper top panel members 114b, but are not connected to the lower top panel members 114a. Each pivot cover 132 also has an edge 136 which extends generally perpendicularly relative to the elongated edge 134. A notch 138 is provided in the edge 136 which is generally L-shaped in configuration such that it has a first portion 140 and a second portion 142. The notch 138 is sized to receive the expeller tube 110 therein.

Figure 7:
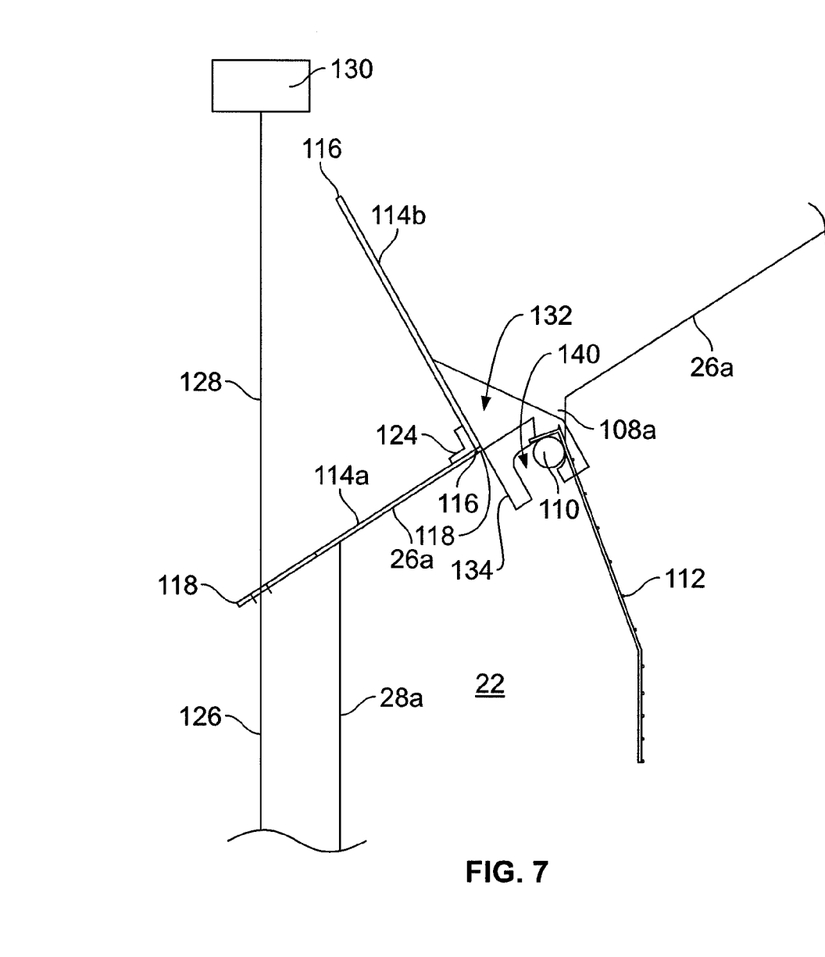
FIG. 7 is a partial cross-sectional side view of the cage free nest of FIG. 1 illustrating an upper top panel thereof being in an opened/raised position.

When the upper top panel members 114b are in their lowered/closed position, the expeller tubes 110 are positioned in the first portions 140 of the notches 138 of the pivot covers 132 distal from the edges 136, as illustrated in FIG. 1. If the house manager desires to visually inspect the egg tray 46, the house manager can manually lift the free end (by the upper edges 116) of the upper top panel members 114b and rotate the upper top panel members 114b upwardly relative to the lower top panel members 114a about the hinges 124. Upon rotation of the upper top panel members 114b, the pivot covers 132 also rotate, moving away from the lower top panel members 114a, and the expeller tubes 110 move into the second portions 142 of the notches 138 of the pivot covers 132 such that the expeller tubes 110 are locked within the second portions 142, thus locking the upper top panel members 114b in the raised/opened position, as illustrated in FIG. 7. The rotation of the upper top panel members 114b and the pivot covers 132 also cause the lower top panel members 114a to slide downwardly on the upper edges 26a, 26b of the sidewalls 22, thus creating an overhang, or an even larger overhang, over the entranceways 40, depending on whether the lower top panel members 114a were already overhanging the entranceways 40. Such a configuration allows for the upper top panel members 114b to be raised/opened and held in place without assistance and without physical removal of the top panel members 114a, 114b for visual inspection of the egg tray 46.

If desired, the roof assembly, namely the top panel members 114a, 114b, may also be physically removed from the cage free nests 20, for example for maintenance or for the removal of dead birds, by moving the pivot covers 132 such that the expeller tubes 110 are no longer positioned within the notches 138 thereof and by disconnecting the cables 128 from the lower top panel members 114a. With the expeller tubes 110 out of the notches 138 and the cables 128 disconnected from the lower top panel members 114a, the top panel members 114a, 114b may be lifted off of, and removed from, the cage free nests 20.

While a preferred embodiment of the invention is shown and described, it is envisioned that those skilled in the art may devise various modifications without departing from the spirit and scope of the foregoing description, the attached drawings and the appended claims.

The invention is claimed as follows:

1. A cage free nest comprising:
   first and second sidewalls defining an entranceway into an interior compartment provided between said first and second sidewalls;
   an egg tray positioned within said interior compartment, spaced from said entranceway, and extending generally between said first and second sidewalls; and
   a nest bottom having a first portion that slopes generally upwardly from proximate said egg tray toward said entranceway, said nest bottom further having a second portion that is raised relative to said first portion and that is proximate to or within said entranceway, said nest bottom has first and second end portions, said first end portion being operatively associated with said egg tray such that said first portion slopes generally upwardly from said first end portion to said second end portion, said second portion is generally formed in a U-shaped configuration such that it generally curves upwardly and outwardly from said first portion and then generally curves downwardly and outwardly to said second end portion.

2. The cage free nest as defined in claim 1, wherein said nest bottom is formed of a plurality of first members extending in a first direction and being separated from one another by a predetermined distance, and a plurality of second members extending in a second direction across at least a portion of said plurality of first members, said plurality of second members being separated from one another by a predetermined distance such that said first and second members define a plurality of openings therebetween.

3. The cage free nest as defined in claim 2, wherein said first and second members are formed of wire.

4. The cage free nest as defined in claim 1, further comprising a ramp member that extends upwardly from a surface to said entranceway such that birds on said surface can walk up said ramp member and move into said interior compartment of said cage free nest in order to lay eggs therein, said first portion of said nest bottom being sloped upwardly from said egg tray such that eggs laid within said cage free nest will gravitate downwardly to said egg tray.

5. The cage free nest as defined in claim 4, wherein said ramp member is formed of a plurality of first members extending in a first direction and being separated from one another by a predetermined distance, and a plurality of second members extending in a second direction across at least a portion of said plurality of first members, said plurality of second members being separated from one another by a predetermined distance such that said first and second members define a plurality of openings therebetween.

6. The cage free nest as defined in claim 5, wherein said first and second members are formed of wire.

7. The cage free nest as defined in claim 4, wherein said ramp member has first and second end portions, said first end portion being positioned proximate to said surface, said second end portion being operatively associated with said second end portion of said nest bottom for holding said ramp member in position relative to said entranceway.

8. A cage free nest comprising:
first and second sidewalls defining an entranceway into an interior compartment provided between said first and second sidewalls;
an egg tray positioned within said interior compartment, spaced from said entranceway, and extending generally between said first and second sidewalls;
a nest bottom having a first portion that slopes generally upwardly from proximate said egg tray toward said entranceway, said nest bottom further having a second portion that is raised relative to said first portion and that is proximate to or within said entranceway, said nest bottom has first and second end portions, said first end portion being operatively associated with said egg tray such that said first portion slopes generally upwardly from said first end portion to said second end portion, said ramp member is formed of a plurality of first members extending in a first direction and being separated from one another by a predetermined distance, and a plurality of second members extending in a second direction across at least a portion of said plurality of first members, said plurality of second members being separated from one another by a predetermined distance such that said first and second members define a plurality of openings therebetween; and
a ramp member that extends upwardly from a surface to said entranceway such that birds on said surface can walk up said ramp member and move into said interior compartment of said cage free nest in order to lay eggs therein, said first portion of said nest bottom being sloped upwardly from said egg tray such that eggs laid within said cage free nest will gravitate downwardly to said egg tray, said ramp member has first and second end portions, said first end portion being positioned proximate to said surface, said second end portion being operatively associated with said second end portion of said nest bottom for holding said ramp member in position relative to said entranceway, said second end portion of said ramp member is provided with a plurality of angled flanges, said plurality of angled flanges configured to extend through said plurality of openings defined on said second end portion of said nest pad in order to secure said ramp member in position relative to said entranceway.

9. A cage free nest comprising:
first and second sidewalls defining an entranceway into an interior compartment provided between said first and second sidewalls, said first and second sidewalls having upper edges that extend generally angularly upwardly from said entranceway;
a roof assembly including first and second top panels, said first and second top panels each extending from proximate said upper edge of said first sidewall to proximate said upper edge of said second sidewall, said first top panel being hingedly connected to said second top panel, said first top panel extending upwardly from proximate said entranceway to said second top panel, said second top panel extending upwardly from said first top panel;
a curtain extending downwardly from said first top panel proximate to said entranceway in order to substantially close off visibility into said interior compartment through said entranceway, said first top panel is configured to be moved upwardly relative to said second top panel about said hinged connection in order to move said curtain upwardly such that said interior compartment is visible through said entranceway; and
a cable assembly secured to said first top panel, said cable assembly configured to move between first and second positions whereby in said first position said first top panel is in a closed position with said curtain in a position to substantially prevent visibility into said interior compartment through said entranceway and whereby in said second position said first top panel is in an open position with said curtain in a position to substantially allow visibility into said interior compartment through said entranceway.

10. The cage free nest as defined in claim 9, wherein said cable assembly includes a cable and an actuator, said cable having a first end connected to said first top panel and a second end connected to said actuator, said actuator being configured to electronically move said cable between said first and second positions.

11. A cage free nest comprising:
first and second sidewalls defining an entranceway into an interior compartment provided between said first and second sidewalls, said first and second sidewalls having upper edges that extend generally angularly upwardly from said entranceway;
a roof assembly including first and second top panels, said first and second top panels each extending from proximate said upper edge of said first sidewall to proximate said upper edge of said second sidewall, said first top panel being hingedly connected to said second top panel, said first top panel extending upwardly from proximate said entranceway to said second top panel, said second top panel extending upwardly from said first top panel;

a curtain extending downwardly from said first top panel proximate to said entranceway in order to substantially close off visibility into said interior compartment through said entranceway; and an expeller tube which extends between said first and second sidewalls, and a pivot cover that is fixedly secured to said second top panel, said pivot cover having a notch therein for receiving and supporting said expeller tube between said first and second sidewalls, said pivot cover configured to pivot relative to said first top panel when said second top panel is moved upwardly relative to said first top panel.

12. The cage free nest as defined in claim 11, wherein said notch has first and second portions, said expeller tube configured to be positioned within said first portion of said notch when said second top panel is in a closed position, and wherein said expeller tube is configured to move into said second portion of said notch when said second top panel is moved upwardly relative to said first top panel to an open position.

13. The cage free nest as defined in claim 12, wherein when said expeller tube is moved into said second portion of said notch, said pivot cover forces said first and second top panels to move downwardly over said upper edges of said first and second sidewalls such that said first end of said top panel is moved to an overhanging position in front of said entranceway.

14. The cage free nest as defined in claim 12, wherein said second top panel is locked into said open position when said expeller tube is positioned into said second portion of said notch.

* * * * *